UNITED STATES PATENT OFFICE.

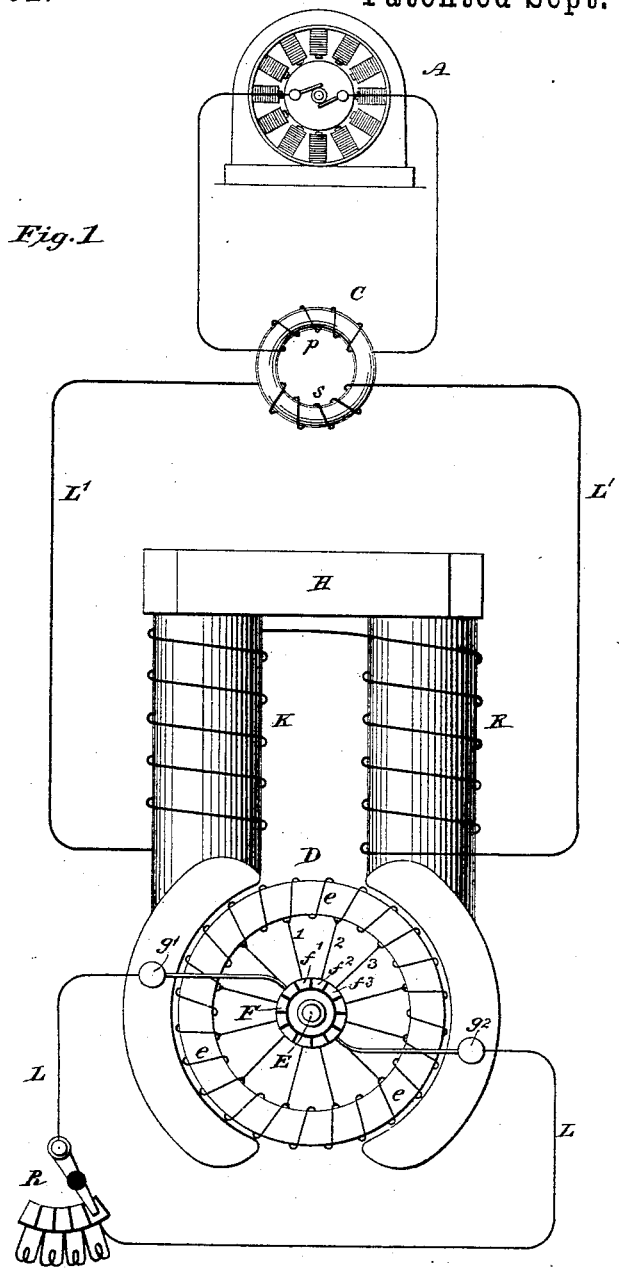

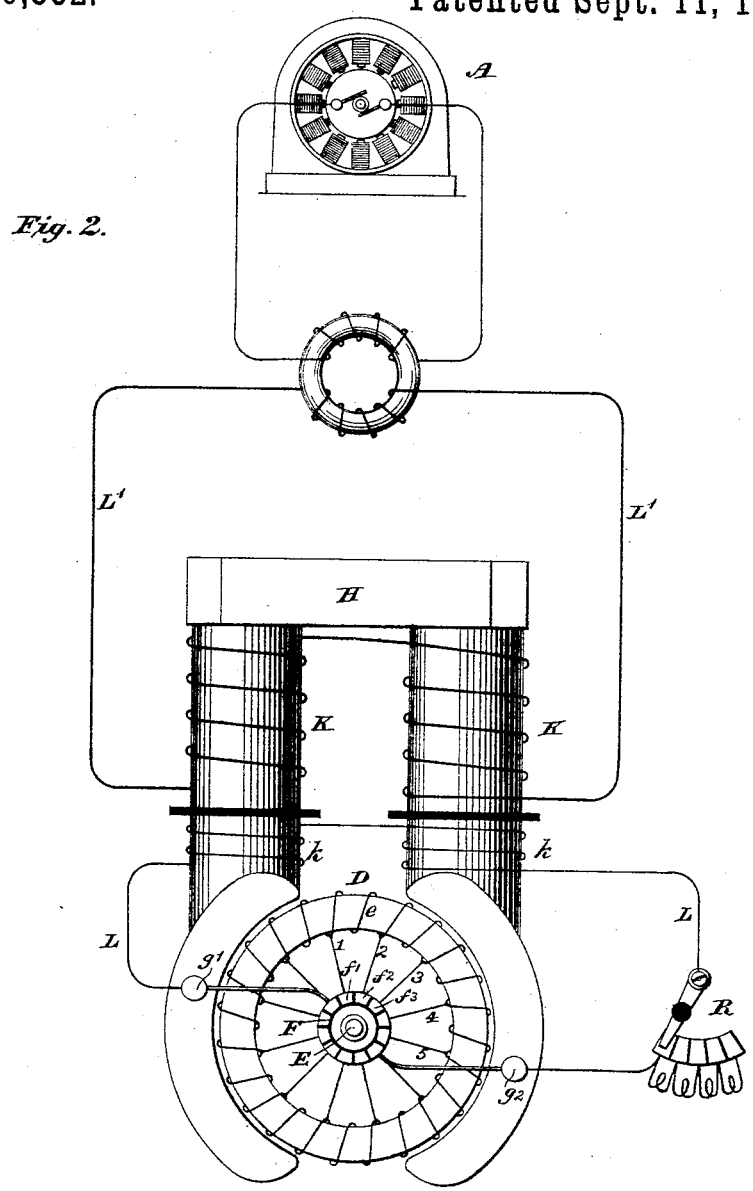

WILLIAM A. ANTHONY, OF MANCHESTER, CONNECTICUT, AND DUGALD C. JACKSON AND HARRIS J. RYAN, OF LINCOLN, NEBRASKA.

ALTERNATE-CURRENT ELECTRIC MOTOR.

SPECIFICATION forming part of Letters Patent No. 389,352, dated September 11, 1888.

Application filed February 24, 1888. Serial No. 265,177. (No model.)

*To all whom it may concern:*

Be it known that we, WILLIAM A. ANTHONY, a citizen of the United States, residing at Manchester, Hartford county, Connecticut, and DUGALD C. JACKSON and HARRIS J. RYAN, citizens of the United States, residing in Lincoln, Lancaster county, Nebraska, have invented certain new and useful Improvements in Alternate-Current Electric Motors, of which the following is a specification.

The invention relates to the construction of motors intended to be driven by alternating electric currents.

The object of the invention is to provide a motor which will operate economically and efficiently under the influence of alternating electric impulses, and the speed of which may be regulated in accordance with the requirements of the service to be performed.

The field-magnet core of the motor may with advantage be formed of electrically-insulated laminæ or sections and wound with magnetizing-coils of suitable character. These are designed to be connected in the circuit of a source of alternating electric impulses. The armature may with advantage be of the so-called "closed-circuit" type—that is to say, a continuous conductor is wound upon the armature-core and its terminals connected with each other, as in a Gramme ring, for example. The commutator-brushes are electrically united with each other, either directly or through supplementary coils applied to the field-magnet. An adjustable resistance may be included in the conductor which unites the brushes. The brushes may be placed at points with reference to the terminals of the armature-coils approximately midway between the neutral points and points of highest potential. Other forms of armatures—such as the so-called "open-circuit" armatures—may be employed under proper conditions.

In the accompanying drawings, Figure 1 is a diagram illustrating an organization of circuits for carrying out the invention, and Fig. 2 illustrates a modification.

Referring to Fig. 1, H represents the field-magnets, and D the armature, of an electric motor. The field-magnet is provided with magnetizing-coils K. These coils are connected in the circuit L' L' of a suitable source of alternating electric currents. The current from this source of electricity may be sent from a generator, A, through the primary coil $p$ of an electric converter, C, whose secondary coil $s$ is connected through the field-magnet coils K. The armature D here shown is of the general type known as the "Gramme ring," and the ends of the coils $e$ are closed with each other. Conductors 1 2 3 4, &c., lead from different points in the length of the conductor $e$ to the contact-plates $f'$ $f^2$ $f^3$ of the commutator F, which is carried upon the shaft E of the armature. Contact-brushes $g'$ and $g^2$ are applied to this commutator, and these brushes are connected with each other by means of an electric conductor, L. An adjustable resistance, R, may be included in the conductor L. The brushes are placed diammetrically opposite, and the positions of greatest efficiency on any given machine may be readily determined experimentally. The brushes may be carried upon any suitable adjustable support, and by adjusting their positions in one direction or the opposite the speed and effort of the motor may be regulated, and also its direction of rotation may be reversed. If desired, its speed and effort may be controlled by modifying the resistance R. The resistance is useful, however, for regulating the current.

In Fig. 2 a modification is shown, in which the conductor L includes coils $k$, which are applied to the field-magnet core. The coils $k$ are in some sense secondary coils to the coils K, and currents will be induced therein.

We claim as our invention—

1. The combination, with the field-magnets of an electric motor, of an armature having its armature-coils permanently included in a closed circuit, a commutator having its plates connected with different points in the length of the armature-coils, and a closed circuit electrically uniting the brushes applied to said plates.

2. The combination, with the field-magnets of an electric motor, of an armature having its armature-coils permanently included in a closed circuit, a commutator having its plates connected with different points in the length of the armature-coils, a closed circuit electrically uniting the brushes applied to said plates, and means for adjusting the position of the brushes.

3. The combination, with the field-magnets of an electric motor, of an armature having its armature-coils permanently included in a closed circuit, a commutator having its plates connected with different points in the length of the armature-coils, and a closed circuit electrically uniting the brushes applied to said plates, said brushes being applied peripherally to the commutator at points intermediate between the line joining the centers of the magnetic poles of the field-magnet and the line drawn at right angles thereto.

4. The combination, with the field-magnets of an electric motor, of an armature having its armature-coils permanently included in a closed circuit, a commutator having its plates connected with different points in the length of the armature-coils, a closed circuit electrically uniting the brushes applied to said plates, and supplemental field-magnet coils applied to the field-magnet and included in the circuit uniting said brushes.

5. The combination, with the field-magnets of an electric motor, of an armature having its armature-coils permanently included in a closed circuit continuously, a commutator having its plates connected with different points in the length of the armature-coils, a closed circuit electrically uniting the brushes applied to said plates, and an adjustable resistance included in the circuit uniting said brushes.

6. The combination, with the field-magnets of an electric motor, of an armature, a commutator having its plates connected with different points in the length of the armature-coils, a closed circuit electrically uniting the brushes applied to said plates, and supplemental field-magnet coils applied to the field-magnet and included in the circuit uniting said brushes.

In testimony whereof I have hereunto subscribed my name this 10th day of January, A. D. 1888.

WILLIAM A. ANTHONY.

Witnesses:
    CHARLES C. ANTHONY,
    ELIZA G. ANTHONY.

In testimony whereof we have hereunto subscribed our names this 2d day of February, A. D. 1888.

DUGALD C. JACKSON.
HARRIS J. RYAN.

Witnesses:
    WM. F. WHITE,
    J. G. WHITE.